US009499914B2

(12) United States Patent
Matsuda et al.

(10) Patent No.: US 9,499,914 B2
(45) Date of Patent: *Nov. 22, 2016

(54) METHOD FOR MANUFACTURING ZINC OR ZINC ALLOY COATED STEEL SHEET AND ZINC OR ZINC ALLOY COATED STEEL SHEET MANUFACTURED BY THE METHOD

(75) Inventors: Takeshi Matsuda, Tokyo (JP); Akira Matsuzaki, Tokyo (JP); Katsutoshi Takashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 13/822,139

(22) PCT Filed: Sep. 29, 2011

(86) PCT No.: PCT/JP2011/005492
§ 371 (c)(1),
(2), (4) Date: Mar. 11, 2013

(87) PCT Pub. No.: WO2012/042883
PCT Pub. Date: Apr. 5, 2012

(65) Prior Publication Data
US 2013/0177779 A1    Jul. 11, 2013

(30) Foreign Application Priority Data
Sep. 29, 2010   (JP) ................. 2010-220014

(51) Int. Cl.
| C23C 28/00 | (2006.01) |
| C09D 5/08 | (2006.01) |
| C09D 5/24 | (2006.01) |
| C23C 22/40 | (2006.01) |
| C23C 22/42 | (2006.01) |
| C23C 22/44 | (2006.01) |
| C08G 18/08 | (2006.01) |
| C09D 175/04 | (2006.01) |
| C23C 28/02 | (2006.01) |

(52) U.S. Cl.
CPC ........... *C23C 28/00* (2013.01); *C08G 18/0814* (2013.01); *C09D 5/084* (2013.01); *C09D 5/24* (2013.01); *C09D 175/04* (2013.01); *C23C 22/40* (2013.01); *C23C 22/42* (2013.01); *C23C 22/44* (2013.01); *C23C 28/021* (2013.01); *C23C 28/025* (2013.01); *C23C 2222/20* (2013.01); *Y10T 428/12569* (2015.01)

(58) Field of Classification Search
CPC ... C23C 28/00; C23C 22/40; C23C 2222/20; C23C 22/42; C23C 22/44; C23C 28/021; C23C 28/025; B05D 3/02; B05D 7/24; B05D 7/14; B05D 2202/00; Y10T 428/12569; C09D 5/084; C09D 5/24; C09D 175/04; C08G 18/0814
USPC ...................................................... 427/388.1
See application file for complete search history.

(56) References Cited

U.S. PATENT DOCUMENTS

| 2002/0090529 A1 | 7/2002 | Ueda et al. |
| 2004/0167266 A1 | 8/2004 | Hasegawa et al. |
| 2010/0035055 A1 | 2/2010 | Okai et al. |

FOREIGN PATENT DOCUMENTS

| CA | 2396041 A1 | 7/2001 |
| CN | 1341160 A | 3/2002 |
| EP | 1 852 523 A1 | 11/2007 |
| JP | 2001-181860 A | 7/2001 |
| JP | 2001-234358 A | 8/2001 |
| JP | 2001-271175 A | 10/2001 |
| JP | 2002-030459 A | 1/2002 |
| JP | 2002-053979 A | 2/2002 |
| JP | 2002-053980 A | 2/2002 |
| JP | 2002-105658 A | 4/2002 |
| JP | 3302677 B2 | 7/2002 |
| JP | 2003-013252 A | 1/2003 |
| JP | 2003-155452 A | 5/2003 |
| JP | 2003-171778 A | 6/2003 |
| JP | 2004-018887 A | 1/2004 |
| JP | 2004-183015 A | 7/2004 |
| JP | 3549455 B2 | 8/2004 |
| JP | 2004-263252 A | 9/2004 |
| JP | 3596665 B2 | 12/2004 |
| JP | 2005-048199 A | 2/2005 |
| JP | 2005-120469 A | 5/2005 |

(Continued)

OTHER PUBLICATIONS

Machine translation of the disclosure of JP 2007-177314.*
Taiwan Office Action dated Nov. 12, 2013, application No. 100135279 with English Translation.
Canadian Office Action dated Jul. 22, 2013, application No. 2,803,862.
International Search Report dated Jan. 10, 2012, application No. PCT/JP2011/005492.
International Preliminary Report on Patentability for International Application No. PCT/JP2011/005492 dated Apr. 16, 2013.
Chinese Office Action dated Apr. 21, 2014, application No. 201180038340.8 with English Translation.
Korean Office Action dated Jun. 5, 2014, application No. 10-2013-7002974 with English Translation.
Supplementary European Search Report dated Sep. 4, 2014, application No. EP 11 82 8449.
Singapore Office Action dated Jul. 10, 2013, application No. 201300395-9.

*Primary Examiner* — Robert S Walters, Jr.
(74) *Attorney, Agent, or Firm* — RatnerPrestia

(57) ABSTRACT

A zinc or zinc alloy coated steel excellent in various properties including corrosion resistance and adhesion properties and, in particular, good conductivity is provided. A method for manufacturing a zinc or zinc alloy coated steel sheet includes: preparing a surface-treatment liquid for a the steel sheet, containing following components, by blending the including: (A) a specific resin emulsion; (B) a tetraalkoxysilane; (C) at least one type of silane coupling agent; (D) a chelating agent; (E) a vanadate compound; (F) a titanium compound; and water; and applying by coating the surface-treatment liquid to a surface of the steel sheet, heating and drying the surface of the steel sheet such that a coating amount per one surface is 200 to 1,000 mg/m² to form a surface treatment coating film on the surface.

8 Claims, No Drawings

(56) References Cited

FOREIGN PATENT DOCUMENTS

| | | |
|---|---|---|
| JP | 2005-194627 A | 7/2005 |
| JP | 2006-213958 A | 8/2006 |
| JP | 2007-177314 A | 7/2007 |
| JP | 2008-169470 A | 7/2008 |
| JP | 2008-274388 A | 11/2008 |
| TW | 201024459 A | 7/2010 |

* cited by examiner

METHOD FOR MANUFACTURING ZINC OR ZINC ALLOY COATED STEEL SHEET AND ZINC OR ZINC ALLOY COATED STEEL SHEET MANUFACTURED BY THE METHOD

CROSS REFERENCE TO RELATED APPLICATIONS

This application is the U.S. National Phase application of PCT/JP2011/005492, filed Sep. 29, 2011, and claims priority to Japanese Patent Application No. 2010-220014, filed Sep. 20, 2010, the discloses of both applications are incorporated herein by reference in their entireties for all purposes.

FIELD OF THE INVENTION

The present invention relates to an environmental-conscious zinc or zinc alloy coated steel sheet for use in automobiles, home electric appliances, building materials, and the like, having a surface-treatment coating formed on a surface of the zinc or zinc coated steel sheet by a surface treatment such that the surface treatment coating is free of controlled pollutants such as hexavalent chromium, and a zinc or zinc alloy coated steel sheet manufactured by the method. In particular, the present invention relates to a method for manufacturing a zinc or zinc alloy coated steel sheet having excellent electromagnetic wave shielding properties and corrosion resistance suitably applied to applications such as electric and/or electronic equipments in which electromagnetic interference (EMI) is to be prevented, and a zinc or zinc alloy coated steel sheet manufactured by the method.

Along with the accelerated digitalization of home electric appliances and increase in CPU speed in recent years, there has increasingly been a public concern on problems of electromagnetic interference that adversely affects peripheral equipments and human bodies. In view of these problems, "Voluntary Control Council for Interference by Information Technology Equipment (VCCI)" has been established in Japan and there has increasingly been a tendency that the relevant industries voluntarily impose control on the EMI problems so as to comply with regulations of VCCI. Examples of such voluntary control include a technology of enclosing an electronic substrate or the like in an electric/electronic appliance by a shield box formed of a metallic (conductive) material to shield electromagnetic wave in order to suppress electromagnetic noise generated from the electronic substrate.

The shield box is adapted to shield against electromagnetic wave by reflecting the electromagnetic wave by a conductive material forming the shield box. The higher conductivity of the material forming the shield box results in the higher reflectance of the electromagnetic wave, thereby increasing the electromagnetic wave shielding properties. For this reason, it is important that the metallic sheet forming the shield box has high conductivity in order to ensure good electromagnetic wave shielding properties of a shield box.

Further, a shield box, which is generally manufactured by shaping a metal sheet, tends to have discontinuous portions (such as seams and junctions) therein and be susceptible to leakage and intrusion of electromagnetic wave through the discontinuous portions. In view of this, a shield box generally has a conductive gasket inserted in the discontinuous portions, to thereby prevent leakage and intrusion of electromagnetic wave.

In this regard, in order to further ensure shielding properties of the shield box, the shield box needs to be configured to allow desired current to pass through across the entire shield box. However, contact pressure between the above-mentioned metal body and the gasket is generally low, whereby electrical conductivity between the metal body and the gasket (which will be simply referred to as "conductivity" hereinafter) and thus an amount of current passing through the contact portion are relatively small. Therefore, it is important to ensure good conductivity between the metal sheet and the gasket, in addition to good conductivity of the metal sheet itself constituting the shield box, in terms of further improving performance of the shield box.

Meanwhile, electric and electronic equipments are used under various environments nowadays and hence a material constituting a shield box is required to be corrosion resistant, i.e. exhibit good corrosion resistance under severe usage environment. Examples of known typical methods of improving corrosion resistance (white rust resistance, red rust resistance) of a zinc or zinc alloy coated steel sheet include chromate treatment. Conventionally, there has been widely applied a zinc or zinc alloy coated steel sheet having undergone a chromate treatment using a treatment liquid containing as a main component chromic acid, dichromatic acid or the salts thereof, to a steel sheet for use in home electronic appliances, building materials and automobiles.

As described above, a metal body (steel sheet) constituting a shield box is required to have relatively high conductivity and, in particular, exhibit good conductivity with respect to a gasket. In this regard, a coating film formed on a steel sheet by chromate treatment can exhibit good rust resistance, if the coating film is relatively thin, although the coating film exhibits poorer conductivity than the base steel sheet. That is, a surface-treated steel sheet subjected to chromate treatment can attain conductivity equivalent to a (non-surface treated) steel sheet by making a less conductive coating film thereof as thin as possible, to sufficiently ensuring good conductivity of the shield box with respect to the gasket and improving both rust resistance and electromagnetic wave shielding properties in a compatible manner. However, in light of the recent global environmental problems, there is an increasing demand for adopting a nonpolluting surface-treated steel sheet without recourse to chromate treatment, which is so-called a chromium-free steel sheet.

There have been proposed various techniques relating to a chromium-free steel sheet. Examples of the techniques include: a technique utilizing a passivation effect of molybdenum acid and tungsten acid that belong to the same Group IVA as chromium acid; a technique of employing a metallic salt of transitional metal such as Ti, Zr, V, Mn, Ni, Co or of rare earth element such as La, Ce; a technology of using as a base a chelating agent such as polyvalent phenolic carboxylic acid like tannic acid or a compound including S and N; a technique of forming a polysiloxane film using a silane coupling agent; and a technology as a combination of these technologies.

Specific examples of the techniques are as follows.
(1) A technique of forming a film from a treatment liquid prepared by blending: a coating agent obtained by reacting an organic resin such as polyvinyl phenol derivatives with an acid component and an epoxy compound; a silane coupling agent; a vanadium compound; and the like (see, for example, JP 2003-013252 A, JP 2001-181860 A, JP 2004-263252 A, and JP 2003-155452 A)

(2) A technique of forming a film including a water-soluble resin, a thiocarbonyl group, a vanadate compound, and a phosphoric acid (see, for example, JP 3549455 B)
(3) A technique of forming a film using a treatment liquid containing a metal (such as Ti) compound, fluorides, and inorganic acid and organic acid such as a phosphate compounds (see JP 3302677 B, JP 2002-105658 A, JP 2004-183015 A, JP 2003-171778 A, JP 2001-271175 A, JP 2006-213958 A, and JP 2005-48199 A)
(4) A technique of forming a composite film from rare earth elements such as Ce, La, Y, and Ti, Zr elements and then forming by concentration an oxide layer on a coating interface side and a hydroxide layer on a surface side in the film (JP 2001-234358 A), a technique of forming a composite film of Ce and Si oxide (JP 3596665 B)
(5) A technique of forming, as an under layer, a phosphate and/or a phosphate compound film containing oxide and forming, as an upper layer thereof, an organic composite film formed of a resin film (see, for example, JP 2002-053980 A and JP 2002-053979 A).
(6) A technique of forming a composite film containing a specific inhibitor component and a silica/zirconium compounds (see, for example, JP 2008-169470 A).

The films formed by the above-mentioned techniques are supposed to suppress occurrence of white rust in zinc through combined addition of organic components or inorganic components. For example, according to the techniques of the above-mentioned references (1) and (2), corrosion resistance is ensured by adding, in principle, an organic resin. However, in such a case as this where a coating film composition contains an organic resin, a steel sheet having the coating film formed thereon fails to have satisfactory conductivity because of the insulating organic resin. The steel sheet is not suitable for use as a material for a shield box, accordingly.

The techniques of the above-mentioned references (3) and (4) propose an inorganic-only film that is completely free of any organic component. However, such a composite film formed by metal oxide and metal hydroxide must be made thick in order to attain sufficient corrosion resistance. Further, the techniques of the references (3) and (4) cannot satisfy both corrosion resistance and conductivity in a compatible manner because a zinc or zinc alloy coated steel sheet surface thereof is covered with a nonconductive film (insulating film) such as zinc phosphate, which is disadvantageous in terms of attaining excellent conductivity.

The technique of the above-mentioned reference (5) is focused on a fact that the conductivity of a surface of a surface-treated steel sheet depends on film thickness of an insulating film covering the surface of the steel sheet and aims to obtain excellent conductivity by reducing the thickness of the insulating film. However, when the film thickness is reduced, the corrosion resistance of the steel sheet is degraded. It is therefore difficult accordingly to the reference (5) to obtain a surface-treated steel sheet which is excellent both in corrosion resistance and conductivity.

The technique of the above-mentioned item (6) utilizes, as an inhibitor component, a passivation effect of a vanadium compound and a low soluble metal salt derived from a phosphate compound and forms, as a skeleton of a film, a composite film of a zirconium compound, silica particles, and a silane coupling agent, to thereby manifest excellent corrosion resistance. However, when good conductivity is required under a challenged condition that contact is made with extremely low load, the film thickness needs to be reduced, which makes it difficult to satisfy both corrosion resistance and conductivity in a compatible manner.

As described above, in the conventional chromium-free coated steel sheet, film thickness of a highly-insulating film needs to be increased in order to reliably obtain as good corrosion resistance as a conventional chromate film. This inevitably makes it difficult for the conventional chromium-free coated steel sheet to ensure good conductivity. As a result, the conventional chromium-free coated steel sheet does not sufficiently satisfy properties required for a steel sheet forming a shield box main body. Further, as described above, it is necessary to sufficiently attain good conductivity between a metal body (steel sheet) and a gasket which are in contact with each other at relatively, low contact pressure in order to more reliably improve shielding properties of the shield box. However, none of the above-mentioned techniques gives any consideration to ensuring good conductivity in such a circumstance as described above.

BACKGROUND OF THE INVENTION

Problems that May be Solved by the Invention

The present invention aims to solve the above-mentioned problems of the prior art, and an object thereof is to provide a method capable of manufacturing a zinc or zinc alloy coated steel sheet having a surface-treatment coating formed thereon, the surface-treatment coating being free of controlled pollutant such as hexavalent chromium and achieving excellent in conductivity, without sacrificing corrosion resistance, under a challenged condition that the surface-treatment coating is in contact with a gasket or the like at relatively low contact pressure.

As a result of a keen study to solve the above-mentioned problems, the inventors of the present invention have found out that these problems can be solved by forming a coating film obtained by:

preparing a surface-treatment liquid containing following components by blending the components at specific blending ratios, the components including: a resin emulsion formed of a cationic urethane resin emulsion having at least one type of cationic functional group selected from the group consisting of primary to tertiary amino groups and quaternary ammonium group, and/or a non-ionic acrylic resin emulsion; a tetraalkoxysilane; at least one type of silane coupling agent having at least one type of reactive functional group selected from the group consisting of an active hydrogen-containing amino group, epoxy group, mercapto group, and methacryloxy group; a chelating agent; a vanadate compound; a titanium compound; and water, applying by coating the surface-treatment liquid to a surface of a zinc or zinc alloy plating layer; and heating and drying the surface of the zinc or zinc alloy plating layer thus coated.

Specifically, the present invention according to exemplary embodiments has following aspects (1), (2), (3), and (4).
(1) A method for manufacturing a zinc or zinc alloy coated steel sheet, comprising: preparing a surface-treatment liquid for a zinc or zinc alloy coated steel sheet, containing following components, by blending the components such that solid mass contents calculated from respective masses of the components satisfy conditions (I) to (V) below at pH in the range of 3 to 6, the components including: (A) a resin emulsion formed of (A-1) a cationic urethane resin emulsion having at least one type of cationic functional group selected from the group consisting of primary to tertiary amino groups and quaternary ammonium group and/or (A-2) a non-ionic acrylic resin emulsion; (B) a tetraalkoxysilane; (C) at least one type of silane coupling agent having at least one type of reactive functional group selected from the group consisting of an active hydrogen-containing amino group, epoxy group, mercapto group, and methacryloxy group; (D) a chelating agent; (E) a vanadate compound; (F) a titanium compound; and water; and applying by coating the surface-treatment liquid to a surface of a zinc or zinc alloy coated steel sheet, heating and drying the surface of the zinc or zinc alloy coated steel sheet such that a coating amount per one surface is in the range of 200 to 1,000 mg/m² to form a surface treatment coating film on the surface, wherein the conditions (I) to (V) are as follows: (I) solid content ($A_S$) of the resin emulsion (A) with respect to the total solid contents of the surface-treatment liquid is 10 to 45 mass %; (II) solid mass ratio ($C_S/A_S$) of solid content ($C_S$) of the silane coupling agent (C) with respect to solid content ($A_S$) of the resin emulsion (A) is 1.51 to 5.89; (III) solid mass ratio ($B_S/D_S$) of solid content ($B_S$) of the tetraalkoxysilane (B) with respect to solid content ($D_S$) of the chelating agent (D) is 0.15 to 1.49; (IV) solid mass ratio ($E_V/D_S$) of content ($E_V$) of the vanadate compound (E) in terms of V with respect to solid content ($D_S$) of the chelating agent (D) is 0.03 to 0.23; and (V) solid mass ratio ($F_T/D_S$) of content ($F_T$) of the titanium compound (F) in terms of Ti with respect to solid content ($D_S$) of the chelating agent (D) is 0.02 to 0.19.

(2) A method for manufacturing a zinc or zinc alloy coated steel sheet, comprising: preparing a surface-treatment liquid for a zinc or zinc alloy coated steel sheet, containing following components, by blending the components such that solid mass contents calculated from respective masses of the components satisfy conditions (I) to (V) below at pH in the range of 3 to 6, the components including: (A) a resin emulsion formed of (A-1) a cationic urethane resin emulsion having at least one type of cationic functional group selected from the group consisting of primary to tertiary amino groups and quaternary ammonium group and/or (A-2) a non-ionic acrylic resin emulsion; (B) a tetraalkoxysilane; (C) at least one type of silane coupling agent having at least one type of reactive functional group selected from the group consisting of an active hydrogen-containing amino group, epoxy group, mercapto group, and methacryloxy group; (D) a chelating agent; (E) a vanadate compound; (F) a titanium compound; and water; and applying by coating the surface-treatment liquid to a surface of a zinc or zinc alloy coated steel sheet, heating and drying the surface of the zinc or zinc alloy coated steel sheet such that a coating amount per one surface is in the range of 200 to 1,000 mg/m² to form a surface treatment coating film on the surface, wherein the conditions (I) to (V) are as follows: (I) solid content ($A_S$) of the resin emulsion (A) with respect to the total solid content of the surface-treatment liquid is 11 to 45 mass %; (II) solid mass ratio ($C_S/A_S$) of solid content ($C_S$) of the silane coupling agent (C) with respect to solid content ($A_S$) of the resin emulsion (A) is 1.51 to 5.35; (III) solid mass ratio ($B_S/D_S$) of solid content ($B_S$) of the tetraalkoxysilane (B) with respect to solid content ($D_S$) of the chelating agent (D) is 0.15 to 1.49; (IV) solid mass ratio ($E_V/D_S$) of content ($E_V$) of the vanadate compound (E) in terms of V with respect to solid content ($D_S$) of the chelating agent (D) is 0.03 to 0.23; and (V) solid mass ratio ($F_T/D_S$) of content ($F_T$) of the titanium compound (F) in terms of Ti with respect to solid content ($D_S$) of the chelating agent (D) is 0.02 to 0.19.

(3) The method for manufacturing a zinc or zinc alloy coated steel sheet according to the aspects (1) or (2) above, wherein the surface-treatment liquid further contains a lubricant (G) in the range of 1 to 10 mass % with respect to the total solid contents of the surface-treatment liquid.

(4) A zinc or zinc alloy coated steel sheet manufactured by the method described in any of the aspects (1) to (3) above.

The present invention can provide a zinc or zinc alloy coated steel sheet having good corrosion resistance and adhesion properties and, in particular, exhibiting good conductivity without degrading the corrosion resistance under a challenged condition that the steel sheet is in contact with a gasket under relatively low contact pressure.

DETAILED DESCRIPTION OF EMBODIMENTS OF THE INVENTION

The present invention according to exemplary embodiments will be described in detail hereinafter.

<Zinc or Zinc Alloy Coated Steel Sheet>

A zinc or zinc alloy coated steel sheet to be manufactured according to the present invention is not particularly limited, and examples thereof include a hot dip galvanized steel sheet (GI) or a galvannealed steel sheet (GA) obtained by alloying the hot dip galvanized steel sheet (GI), a hot dip Zn-5 mass % Al alloy coated steel sheet (GF), a hot dip Zn-55 mass % Al alloy coated steel sheet (GL), an electrogalvanized steel sheet (EG), and an electrolytic Zn—Ni alloy coated steel sheet (Zn-11 mass % Ni), and the like.

<Surface-Treatment Liquid for Zinc or Zinc Alloy Coated Steel Sheet>

A surface-treatment liquid for a zinc or zinc alloy coated steel sheet employed in the present invention preferably contains: (A) a resin emulsion formed of (A-1) a cationic urethane resin emulsion having cationic functional group and/or (A-2) a non-ionic acrylic resin emulsion; (B) a tetraalkoxysilane; (C) a silane coupling agent; (D) a chelating agent; (E) a vanadate compound; (F) a titanium compound; and water.

When the surface-treatment liquid containing the resin emulsion (A), formed of (A-1) a cationic urethane resin emulsion and/or (A-2) a non-ionic acrylic resin emulsion, is used for forming a surface-treatment coating film on a surface of a zinc or zinc alloy coated steel sheet, there can be obtained a zinc or zinc alloy coated steel sheet which is excellent in various properties including corrosion resistance of the steel sheet, adhesion properties of the coating film thus formed, and corrosion resistance of the steel sheet after alkaline degreasing and exhibits good formability as an advantage of a steel sheet having a resin film formed thereon.

The cationic urethane resin constituting the cationic urethane resin emulsion (A-1) is not particularly limited in terms of polyol and isocyanate components as monomer constituent components thereof and a polymerization method, as long as the cationic urethane resin includes as a cationic functional group at least one type of a cationic functional group selected from the group consisting of primary to tertiary amino groups and quaternary ammonium group. Examples of the cationic functional group include amino group, methylamino group, ethylamino group, dimethylamino group, diethylammino group, trimethylamino group, and triethylamino group. It should be noted, however, that the cationic functional group is not particularly limited as long as it is selected from primary to tertiary amino groups and quaternary ammonium group and does not adversely affect the effects of the present invention.

Type of the non-ionic acrylic resin emulsion (A-2) is not particularly limited and examples thereof acceptable for use include an acrylic resin emulsified by a nonionic emulsifier such as a water-based emulsion obtained by emulsifying in water vinyl based monomer like acrylic acid, methacrylic acid, acrylic acid ester, methacrylic acid ester or styrene in the presence of a nonionic surfactant (emulsifier) having in the structure thereof a polyethylene oxide or a polypropylene oxide.

Contents of the resin emulsion (A), formed of the cationic urethane resin emulsion (A-1) and/or the non-ionic urethane resin emulsion (A-2), is adjusted so that solid content ($A_S$) thereof falls within the range of 10 to 45 mass %, more preferably within the range of 11 to 45 mass %, and further more preferably within the range of 15 to 30 mass %, with respect to the total solid content of the surface-treatment liquid. When the content of the resin emulsion (A) is less than 10 mass %, a zinc or zinc alloy coated steel sheet excellent in adhesion properties cannot be obtained. When the content of the resin emulsion (A) exceeds 45 mass %, corrosion resistance of the steel sheet deteriorates. In the present invention, "solid content" represents a solid component for analysis, obtained by collecting 1 g of a component constituting a surface treatment coating, and heating and drying the collected sample in an oven for two hours at 110° C. Accordingly, "solid content" does not include a solvent or the like.

Further, the surface-treatment liquid contains tetraalkoxysilane (B), as well as the resin emulsion (A). When a surface-treatment liquid containing the tetraalkoxysilane (B) is used for forming a surface-treatment coating film on a surface of a zinc or zinc alloy coated steel sheet, there can be obtained a zinc or zinc alloy coated steel sheet which is excellent in various properties including corrosion resistance of the steel sheet, adhesion properties of the coating film thus formed, and corrosion resistance of the steel sheet after alkaline degreasing and exhibits good heat resistance and weldability as advantages of a steel sheet having an inorganic film formed thereon. Although reasons why such excellent characteristics can be obtained by use of the tetraalkoxysilane are not clear, it is assumed that these characteristics are probably derived from a phenomenon that, when the tetraalkoxy silane (B) and the above-mentioned resin emulsion (A) are used in combination, the tetra-alkoxy silane (B) and the cationic urethane resin and/or the non-ionic urethane resin form a film having a three-dimensional cross-linked structure.

Type of the tetra-alkoxy silane (B) is not particularly limited and examples thereof include tetrametoxysilane, tetraethoxysilane, and tetrapropoxysilane, and the like. At least one type of these compounds may be used. Among these examples, tetraetoxysilane and tetramethoxysilane are preferable because use thereof results in good corrosion resistance of a zinc or zinc alloy coated steel sheet.

The surface-treatment liquid contains, in addition to the resin emulsion (A) and the tetraalkoxysilane (B), at least one type of a silane coupling agent (C) having at least one type of reactive functional group selected from the group consisting of active hydrogen-containing amino group, epoxy group, mercapto group, and methacryloxy group. When a surface-treatment liquid containing the silane coupling agent (C) is used for forming a surface-treatment coating film on a surface of a zinc or zinc alloy coated steel sheet, there can be obtained a coating film on a surface of a zinc or zinc alloy coated steel sheet, which film is excellent in various properties including corrosion resistance of the steel sheet and corrosion resistance of the steel sheet after alkaline degreasing and, in particular, exhibits good adhesion properties and scratch resistance.

At least one type of the silane coupling agent (C) having at least one type of reactive functional group selected from the group consisting of active hydrogen-containing amino group, epoxy group, mercapto group, and methacryloxy group is not particularly limited in type. For example, it is preferable to use at least one type of trialkoxysilanes each having three alkoxy groups and at least one type of reactive functional group selected from active hydrogen-containing amino group, epoxy group, vinyl group, mercapto group, and methacryloxy group. Specific examples of the silane coupling agent (C) for use include, without no particular limitation thereto: N-(aminoethyl)-3-aminopropyltrimethoxysilane, 3-aminopropyltrimethoxysilane, 3-glycidoxypropyltrimethoxysilane, 3-glycidoxypropylmethyldimethoxysilane, 2-(3,4 epoxycyclohexyl)-ethyltriethoxysilane, vinyltriethoxysilane, 3-mercaptopropyltrimethoxysilane.

Content of at least one type of the silane coupling agent (C) having at least one type of a reactive functional group selected from active hydrogen-containing amino group, epoxy group, mercapto group, and methacryloxy group is adjusted such that a mass ratio ($C_S/A_S$) of solid content of the silane coupling agent (C) with respect to the resin emulsion (A) is preferably within the range of 1.51 to 5.89, more preferably within the range of 1.51 to 5.35, and further more preferably within the range of 1.66 to 5.89. When the mass ratio ($C_S/A_S$) is less than 1.51, a zinc or zinc alloy coated sheet that is excellent in corrosion resistance cannot be obtained. When the mass ratio exceeds 5.89, adhesion properties of the coating film deteriorate.

Further, in order to ensure good storage stability of the surface-treatment liquid, the surface-treatment liquid contains a chelating agent (D). Regarding why good storage stability can be ensured by the chelating agent (D), it is assumed that the chelating agent (D) causes an effect of inhibiting the tetraalkoxysilane (B) from being polymerized in the surface-treatment liquid such the surface-treatment liquid is prevented from being deteriorated in long-term storage after preparation and the quality at the time of the preparation is maintained. Further, the chelating agent (D) is needed in order to stably dissolve a vanadate compound (E) and a titanium compound (F) described below into the surface-treatment liquid. Yet further, the chelating agent (D) causes a smaller etching effect on a surface of a zinc or zinc alloy coated layer than inorganic acid such as nitric acid, phosphoric acid, sulfuric acid, and hydrofluoric acid and does not form a nonconductive film such as a zinc phosphate film. Presumably for the reasons described above, a zinc or zinc alloy coated steel sheet having a coating film formed by using a surface-treatment using containing the chelating agent (D) exhibits better conductivity than a zinc or zinc alloy coated steel sheet having a coating film formed otherwise.

Type of the chelating agent (D) is not particularly limited and examples thereof include at least one type of: hydroxy carboxylic acid such as acetic acid, tartaric acid, and malic acid; mono carboxylic acid; polycarboxylic acid such as dicarboxylic acid and tricarboxylic acid like oxalic acid, malonic acid, succinic acid, citric acid and adipic acid; amino carboxylic acid such as glycine; phosphonic acid; and phosphonate. At least one type of these compounds may be used. Among these examples, a compound having carboxyl group or phosphonic acid group in one molecule is particularly preferable in view of attaining good storage stability of the surface-treatment liquid, as well as good corrosion resistance and conductivity of the zinc or zinc alloy coated steel sheet.

Content of the chelating agent (D) is adjusted such that a mass ratio ($B_S/D_S$) of solid content of the tetraalkoxysilane (B) with respect to solid content of the chelating agent (D) is preferably within the range of 0.15 to 1.49, and more preferably within the range of 0.17 to 1.30. A zinc or zinc alloy coated steel sheet excellent in corrosion resistance cannot be obtained when the mass ratio ($B_S/D_S$) is less than 0.15 or higher than 1.49.

The surface-treatment liquid for a zinc or zinc alloy coated steel sheet for use in the present invention further contains a vanadate compound (E). The vanadate compound (E) exists in a uniformly dispersed and highly water-soluble state in a coating film formed on a surface of a zinc or zinc alloy coated steel sheet and exhibits a so-called "inhibitor effect" in zinc corrosion. Examples of the vanadate compound (E) for use include ammonium metavanadate, sodium metavanadate, and vanadium acetylacetonate. At least one type of these compounds may be used possibly in combination.

Content of the vanadate compound (E) is adjusted such that a ratio ($E_V/D_S$) of V-equivalent content ($E_V$) of the vanadate compound (E) with respect to solid content ($D_S$) of the chelating agent (D) is preferably within the range of 0.03 to 0.23, and more preferably within the range of 0.04 to 0.20. When the mass ratio ($E_V/D_S$) is less than 0.03, a zinc or zinc alloy coated steel sheet excellent in corrosion resistance cannot be obtained. When the mass ration exceeds 0.23, it is difficult to dissolve the vanadate compound (E) into the surface-treatment liquid.

The surface-treatment liquid further contains a titanium compound (F). The titanium compound (F) effectively imparts a coating film formed on a surface of the zinc or zinc alloy coated steel sheet (particularly in portions thereof to be processed) with excellent corrosion resistance. Examples of the titanium compound (F) include titanyl sulfate, titanyl nitrate, titanium nitrate, titanyl chloride, titanium chloride, titania sol, titanium oxide, potassium titanyl oxalate; hexafluorotitanic acid; ammonium hexafluorotitanate; titanium lactate; titanium tetraisopropoxide; titanium acetylacetonate; and bis(acetylacetone)diisopropyl titanium. Examples of the titanium compound (F) further include: metatitanic acid obtained by subjecting an aqueous solution of titanyl sulfate to thermal hydrolysis; orthotitanic acid obtained by alkaline neutralization and salts thereof.

Content of the titanium compound (F) is adjusted such that a mass ratio ($F_T/D_S$) of Ti-equivalent content ($F_T$) of the titanium compound (F) with respect to solid content ($D_S$) of the chelating agent (D) is within the range of 0.02 to 0.19, and more preferably within the range of 0.03 to 0.15. When the mass ratio ($F_T/D_S$) is less than 0.02, a zinc or zinc alloy coated steel sheet excellent in corrosion resistance cannot be obtained. When the mass ratio exceeds 0.19, it is difficult to dissolve the titanium compound (F) into the surface-treatment liquid.

The surface-treatment liquid for a steel sheet is required to have a pH value in the range of 3 to 6, more preferably in the range of 4 to 5. When the pH of the surface-treatment liquid is less than 3, storage stability of the surface-treatment liquid deteriorates and zinc may be etched too much, possibly deteriorating corrosion resistance and conductivity of the zinc or zinc alloy coated steel sheet. When the pH exceeds 6, corrosion resistance of the zinc or zinc alloy coated steel sheet and adhesion properties of a film formed on the steel sheet surface deteriorate. In the present invention, ammonium, amine, a derivative of amine, and amino poly carboxylic acid may preferably be used as alkali for adjusting pH, while acid may preferably be selected from among the above-mentioned chelating agents (D). In a case where the pH is adjusted by using an inorganic acid such as nitric acid, phosphoric acid, sulfuric acid, and hydrofluoric acid, conductivity of the zinc or zinc alloy coated steel sheet tends to be deteriorated. For this reason, an amount of the inorganic acid to be added need be less than 4 mass % with respect to the total solid content of the surface-treatment liquid.

In an embodiment of the present invention, the surface-treatment coating film is adjustingly formed on a surface of the zinc or zinc alloy coated layer such a coating amount per one surface is in the range of 200 to 1,000 mg/m$^2$, preferably in the range of 300 to 800 mg/m$^2$. When a coating amount is less than 200 mg/m$^2$, corrosion resistance may be insufficient. When a coating amount exceeds 1,000 mg/m$^2$, conductivity of the zinc or zinc alloy coated steel sheet may deteriorate.

A lubricant (G) may be added to the surface-treatment liquid in order to improve lubrication properties. Examples of the lubricant may include a solid lubricant such as polyethylene wax, oxidized polyethylene wax, oxidized polypropylene wax, carnauba wax, paraffin wax, montan wax, a rice wax, a Teflon® wax, carbon disulfide, and graphite. At least one type of the aforementioned solid lubricants may be used possibly in combination.

Content of the lubricant (G) used in the present invention is preferably in the range of 1 to 10 mass %, more preferably be equal to or less than 7 mass %, and further more preferably in the range of 1 to 5 mass %, with respect to the total solid content of the surface-treatment liquid. When the content of the lubricant (G) is less than 1 mass %, no improvement is observed in lubrication properties. When the content of the lubricant (G) exceeds 10 mass %, corrosion resistance deteriorates.

Further, a surfactant (what is called "wetting agent" for forming a uniform film on a surface to be coated, a thickening agent, a conductive material for improving conductivity, a coloring pigment for improving design performance, and a solvent for improving film-forming properties, may further be added to the surface-treatment liquid according to necessity.

The surface-treatment liquid can be obtained by mixing the above-mentioned components in water such as deionized water or distilled water. Solid contents or ratios in the surface-treatment liquid may be appropriately selected. Further, water-soluble solvent based on alcohol, ketone, or cellosolve, surfactant, defoamer, leveling agent, an antibacterial and antifungal agent, and a colorant, and the like may be added to the surface-treatment liquid according to necessity. Addition of these materials improves drying properties, coating appearance, workability, storage stability, and design performance of the surface-treatment liquid. However, it is important that these materials are added only to such an extent that addition thereof does not adversely affect qualities to be obtained in the present invention. The maximum amount of these additives to be added is to be less than 5 mass % with respect to the total solid content of the surface-treatment liquid.

As described above, in the present invention, a surface-treatment coating is formed by applying by coating a pre-determined surface-treatment liquid to a surface of a zinc or zinc alloy coated layer of a zinc or zinc alloy coated steel sheet and then heating and drying the surface-treatment liquid thus coated. Examples of a method of applying by coating the surface-treatment liquid onto a zinc or zinc alloy coated steel sheet include: a roll coating method; a bar coating method; a immersion method; and a spray coating method, and an appropriate method may be selected depending on shape or the like of a zinc or zinc alloy coated steel sheet to be processed. More specifically, for example, in a case where the zinc or zinc alloy coated steel sheet is to be processed in a sheet shape, a roll coating method or a bar coating method may be employed, or the surface-treatment liquid may be sprayed onto the zinc or zinc alloy coated steel sheet and then a coating amount may be adjusted by a roll squeeze or gas blown at high pressure. In a case where the zinc or zinc alloy coated steel sheet has already been shaped into a product, there may be selected a method in which the product is immersed in the surface-treatment liquid, taken out of the liquid, and in some cases a coating amount is adjusted by blowing away an excess surface-treatment liquid with compressed air.

Before applying the surface-treatment liquid onto the zinc or zinc alloy coated steel sheet, the zinc or zinc alloy coated steel sheet may be subjected to a pre-treatment for removing oil and stains from a surface thereof according to necessity. A zinc or zinc alloy coated steel sheet is often coated with anti-rust oil to prevent the steel sheet from rusting. If the zinc or zinc alloy coated steel sheet is free of anti-rust oil, the steel sheet still has oil and stains attached thereon during the production process. These coating oil and/or dirt like oil and stains degrade wettability of a surface of the zinc or zinc alloy coated layer and disturbs smooth formation of a uniform first layer coating film of the surface-treatment liquid on the surface. In view of this, conducting the aforementioned pre-treatment cleans a surface of the zinc or zinc alloy coated layer, facilitating uniform wetting thereof. Needless to say, the pre-treatment is not particularly needed in a case where a surface of the zinc or zinc alloy coated steel sheet is free of oil and stains and can be uniformly wetted with the surface-treatment liquid (A). The method of the pre-treatment is not particularly limited, and examples thereof may include: hot water rinsing; solvent cleaning; alkaline degreasing cleaning; and the like.

The heating temperature (peak metal temperature) when the surface-treatment liquid applied on a surface of the zinc or zinc alloy coated layer is heat-dried is generally in the range of 60 to 200° C., and preferably in the range of 80 to 180° C. When the heating temperature is equal to or higher than 60° C., no moisture, serving as main solvent, remains in the coating film. When the heating temperature is equal to or lower than 200° C., the generation of cracks in the coating film can be suppressed. Accordingly, problems such as deterioration of corrosion resistance of the zinc or zinc alloy coated steel sheet can be prevented from arising by setting the heating temperature within the aforementioned range. Regarding the heating time, optimum conditions are to be selected depending on the type or the like of a zinc or zinc alloy coated steel sheet to be used. The heating time is set preferably in the range of 0.1 to 60 seconds, and more preferably in the range of 1 to 30 seconds, in terms of productivity or the like.

A surface-treatment coating film obtained as described above is excellent in heat resistance, weldability, and adhesion properties. According to the present invention, it is possible to obtain a zinc or zinc alloy coated steel sheet having desired conductivity can be obtained without degrading corrosion resistance by forming such a surface-treatment coating film as described above on a surface of a zinc or zinc alloy coated layer of a zinc or zinc alloy coated steel sheet.

Reasons for why such good performances are achieved are presumably as follows.

First, the resin emulsion (A) formed of cationic urethane resin emulsion (A-1) and/or non-ionic acrylic resin emulsion (A-2), the tetraalkoxysilane (B), and the silane coupling agent (C) among the components forming the surface-treatment coating form a skeleton of a coating film formed on a surface of the zinc or zinc alloy coated layer of the zinc or zinc alloy coated steel sheet. A coating film containing the resin emulsion (A) formed of the cationic urethane resin emulsion (A-1) and/or the non-ionic acrylic resin emulsion (A-2) is, once dried, insoluble to water and causes a barrier effect, thereby making it possible to obtain a zinc or zinc alloy coated steel sheet that is excellent in various properties including corrosion resistance of the zinc or zinc alloy coated steel sheet, adhesion properties of the coating film, and corrosion resistance of the zinc or zinc alloy coated steel sheet after alkaline degreasing and exhibits good formability as an advantage of a steel sheet having a resin film formed thereon.

Further, it is assumed that inclusion of the tetra-alkoxy silane (B) contributes to three-dimensional cross-linking between a silanol group generated from alkoxy group of the tetraalkoxysilane (B) and the cationic urethane resin and/or the non-ionic urethane resin emulsion of the resin emulsion (A) and therefore formation of a densely-structured film. Yet further, it is assumed that inclusion of the silane coupling agent (C) results in cross-linking reaction between the silane coupling agent (C) and the silanol group of the tetraalkoxysilane (B), contributing enhancing binding force of the film.

Yet further, the vanadate compound (E) and the titanium compound (F) among the components forming the surface-treatment coating exist in a uniformly dispersed and highly water-soluble state in the coating film, thereby exhibiting a so-called inhibitor effect in zinc corrosion. Specifically, it is assumed that at least some of the vanadate compound (E) and the titanium compound (F) are ionized under a corrosion environment and passivated, thereby suppressing corrosion of zinc itself. It is assumed that the titanium compound (F), in particular, is preferentially dissolved into a defect portion of a coating film generated in a processed portion of a zinc or zinc alloy coated steel sheet in a forming process for shaping the steel sheet into a desired shape, thereby suppressing corrosion of zinc.

The chelating agent (D) among the components forming the surface-treatment coating presumably causes an effect of suppressing polymerization of the tetraalkoxysilane (B) in the surface treatment layer, as well as an effect of stably dissolving the vanadate compound (E) and the titanium compound (F) into the surface-treatment liquid. Further, the carboxyl group or the phosphonic acid group of the chelating agent (D) presumably functions as a crosslinking agent which is reacted with the aforementioned skeleton component of the coating film to form a densely-structured skeleton during the film forming process by drying and heating, without forming an insulating film (nonconductive film) such as zinc phosphate, thereby contributing to the improvement in conductivity.

In summary, in the surface-treatment coating film, a coating film formed by the cationic urethane resin emulsion and/or the non-ionic urethane resin emulsion, the tetraalkoxysilane, and the silane coupling agent achieves high corrosion resistance in spite of reduced thickness and the coating film can maintain good conductivity in a challenged condition that the film or the steel sheet is in contact with a gasket or the like at relatively low pressure by a structure thereof containing corrosion inhibitors such as the chelating agent, the vanadate compound, and the titanium compound.

According to the present invention, there can be provided a zinc or zinc alloy coated steel sheet which is excellent in various properties such as corrosion resistance and adhesion properties and exhibits, in particular, good conductivity under a challenged condition that the steel sheet is in contact with other members at relatively low pressure without sacrificing corrosion resistance. The zinc or zinc alloy coated steel sheet of the present invention can be applied to various applications and can be suitably employed, for example, as a material for use in various fields such as architecture, electric appliances, and automobiles.

EXAMPLES

Next, effects of the present invention will be described with reference to Examples and Comparative examples. These Examples are provided only for illustrative purpose and by no means restrict the present invention.

1. Method of preparing a test (sample) sheet
(1) Test Sheet (Material)
Following commercially available materials were used as test sheets.
(i) Electrogalvanized steel sheet (EG): sheet thickness 0.8 mm; coating amount 20/20 (g/m$^2$)
(ii) Hot dip galvanized steel sheet (GI): sheet thickness 0.8 mm; coating amount 60/60 (g/m$^2$)
(iii) Galvannealed steel sheet (GA): sheet thickness 0.8 mm; coating amount 40/40 (g/m$^2$) In the present Examples, a coating amount represents an amount of coating on a main surface of each steel sheet. For example, in the case of an electrogalvanized steel sheet, "20/20 (g/m$^2$)" represents that the steel sheet has a plating or coating layer of 20 g/m$^2$ on respective surfaces of the electrogalvanized steel sheet.

(2) Pre-Treatment (Cleaning)
The method of preparing a test piece included: first processing a surface of each of the above-mentioned test steel sheets using "PALKLIN N346S" manufactured by Nihon Parkerizing Co., Ltd., to remove oil and stains from the surface; then washing the surface with tap water to confirm that a metal material surface is wetted 100% with water; further wetting the surface with pure water (deionized water); and drying the test sheet in an oven of 100° C. atmosphere to remove moisture therefrom. The sheet thus obtained is used as a test piece.

(3) Preparation of Surface-Treatment Liquid
Components of respective compositions (mass ratios) shown in Table 1 were mixed in water to obtain respective surface-treatment liquids for a zinc or zinc alloy coated steel sheet. Blended amounts of the component (G) in Table 1 each present an amount (g) to be blended into 1 kg of the surface-treatment liquid. Further, $A_S$, $B_S$, $C_S$, $D_S$, $E_V$, and $F_T$ in Table 1 represent solid content of the resin emulsion (A), solid content of the tetraalkoxysilane (B), solid content of the silane coupling agent (C), solid content of the chelating agent (D), content of the vanadate compound (E) in terms of V, and of the titanium compound (F) in terms of Ti, respectively.

TABLE 1

Surface-Treatment Liquid for Zinc or Zinc Alloy Coated Steel Sheet

| Evaluation Criterion | A type | B type | C type | D type | E type | F type | G type | G amount | $A_S$ mass % | $C_S/A_S$ mass % | $B_S/D_S$ mass % | $E_V/D_S$ mass % | $F_T/D_S$ mass % | G mass % | pH |
|---|---|---|---|---|---|---|---|---|---|---|---|---|---|---|---|
| Example 1 | A1 | B1 | C1 | D1 | E1 | F1 | — | — | 10 | 5.89 | 0.50 | 0.08 | 0.06 | — | 4.0 |
| Example 2 | A1 | B1 | C1 | D1 | E1 | F2 | — | — | 10 | 5.89 | 0.50 | 0.08 | 0.06 | — | 4.0 |
| Example 3 | A1 | B1 | C1 | D1 | E1 | F2 | — | — | 20 | 2.41 | 0.50 | 0.08 | 0.06 | — | 3.0 |
| Example 4 | A1 | B1 | C1 | D1 | E1 | F2 | — | — | 20 | 2.41 | 0.50 | 0.08 | 0.06 | — | 4.0 |
| Example 5 | A1 | B1 | C1 | D1 | E1 | F2 | — | — | 20 | 2.41 | 0.50 | 0.08 | 0.06 | — | 5.0 |
| Example 6 | A1 | B1 | C1 | D1 | E1 | F2 | — | — | 20 | 2.41 | 0.50 | 0.08 | 0.06 | — | 6.0 |
| Example 7 | A1 | B1 | C2 | D1 | E1 | F2 | — | — | 20 | 2.41 | 0.50 | 0.08 | 0.06 | — | 4.0 |
| Example 8 | A1 | B1 | C3 | D1 | E1 | F2 | — | — | 20 | 2.41 | 0.50 | 0.08 | 0.06 | — | 4.0 |
| Example 9 | A1 | B1 | C1 | D1 | E1 | F2 | — | — | 40 | 1.51 | 0.83 | 0.08 | 0.06 | — | 4.0 |
| Example 10 | A1 | B2 | C1 | D1 | E1 | F2 | — | — | 40 | 1.51 | 0.83 | 0.08 | 0.06 | — | 4.0 |
| Example 11 | A1 | B1 | C1 | D1 | E2 | F2 | — | — | 35 | 1.51 | 0.99 | 0.08 | 0.06 | — | 4.0 |
| Example 12 | A1 | B1 | C2 | D1 | E2 | F2 | — | — | 30 | 1.51 | 1.49 | 0.08 | 0.06 | — | 4.0 |
| Example 13 | A2 | B2 | C1 + C2 | D2 | E2 | F2 | — | — | 45 | 1.51 | 0.50 | 0.08 | 0.06 | — | 4.0 |
| Example 14 | A2 | B2 | C1 + C2 | D2 | E2 | F2 | — | — | 45 | 1.51 | 0.50 | 0.08 | 0.06 | — | 4.0 |
| Example 15 | A2 | B2 | C1 + C2 | D2 | E2 | F2 | — | — | 45 | 1.51 | 0.50 | 0.08 | 0.06 | — | 4.0 |
| Example 16 | A2 | B2 | C1 + C2 | D2 | E2 | F2 | — | — | 45 | 1.51 | 0.50 | 0.08 | 0.06 | — | 4.0 |
| Example 17 | A2 | B2 | C1 + C2 | D2 | E2 | F2 | — | — | 45 | 1.51 | 0.50 | 0.08 | 0.06 | — | 4.0 |
| Example 18 | A1 | B1 | C2 | D1 | E2 | F2 | — | — | 40 | 1.66 | 0.50 | 0.08 | 0.06 | — | 4.0 |
| Example 19 | A1 | B1 | C2 | D1 | E2 | F2 | — | — | 20 | 3.02 | 0.50 | 0.08 | 0.06 | — | 4.0 |
| Example 20 | A1 | B1 | C1 | D1 | E1 | F2 | — | — | 15 | 4.52 | 0.50 | 0.08 | 0.06 | — | 4.0 |
| Example 21 | A2 | B1 | C1 | D1 | E1 | F2 | — | — | 15 | 4.52 | 0.50 | 0.08 | 0.06 | — | 4.0 |
| Example 22 | A2 | B1 | C1 | D1 | E1 | F2 | — | — | 45 | 1.51 | 0.53 | 0.08 | 0.07 | — | 4.0 |
| Example 23 | A2 | B2 | C1 + C2 | D2 | E2 | F2 | — | — | 45 | 1.51 | 0.50 | 0.08 | 0.06 | — | 4.0 |
| Example 24 | A2 | B1 | C1 | D1 | E1 | F2 | — | — | 30 | 1.51 | 0.25 | 0.04 | 0.03 | — | 4.0 |
| Example 25 | A2 | B2 | C1 | D1 | E1 | F2 | — | — | 25 | 1.51 | 0.17 | 0.03 | 0.02 | — | 4.0 |
| Example 26 | A2 | B2 | C1 | D1 | E1 | F2 | — | — | 45 | 1.51 | 0.50 | 0.10 | 0.06 | — | 4.0 |
| Example 27 | A2 | B2 | C1 | D2 | E1 | F2 | — | — | 45 | 1.51 | 0.50 | 0.10 | 0.06 | — | 4.0 |
| Example 28 | A2 | B2 | C1 | D2 + D3 | E1 | F2 | — | — | 45 | 1.51 | 0.50 | 0.10 | 0.06 | — | 4.0 |
| Example 29 | A2 | B2 | C1 | D1 | E1 | F2 | — | — | 40 | 1.51 | 0.50 | 0.15 | 0.06 | — | 4.0 |
| Example 30 | A2 | B2 | C3 | D1 | E1 | F2 | — | — | 40 | 1.51 | 0.50 | 0.23 | 0.06 | — | 4.0 |
| Example 31 | A2 | B2 | C3 | D1 | E1 | F1 | — | — | 45 | 1.51 | 0.50 | 0.08 | 0.09 | — | 4.0 |
| Example 32 | A2 | B2 | C1 + C2 | D2 | E2 | F2 | — | — | 45 | 1.51 | 0.50 | 0.08 | 0.06 | — | 4.0 |
| Example 33 | A2 | B2 | C3 | D1 | E2 | F1 | — | — | 45 | 1.51 | 0.50 | 0.08 | 0.09 | — | 4.0 |

TABLE 1-continued

Surface-Treatment Liquid for Zinc or Zinc Alloy Coated Steel Sheet

| Evaluation Criterion | A type | B type | C type | D type | E type | F type | G type | G amount | $A_S$ mass % | $C_S/A_S$ mass % | $B_S/D_S$ mass % | $E_V/D_S$ mass % | $F_T/D_S$ mass % | G mass % | pH |
|---|---|---|---|---|---|---|---|---|---|---|---|---|---|---|---|
| Example 34 | A1 | B1 | C3 | D2 | E1 | F1 | — | — | 45 | 1.51 | 0.50 | 0.08 | 0.13 | — | 4.0 |
| Example 35 | A1 | B1 | C3 | D2 | E1 | F1 | — | — | 40 | 1.51 | 0.50 | 0.08 | 0.19 | — | 4.0 |
| Example 36 | A1 | B1 | C3 | D2 | E1 | F1 | G1 | 1.3 g | 40 | 1.51 | 0.50 | 0.08 | 0.06 | 1.0 | 4.0 |
| Example 37 | A1 | B1 | C1 | D2 | E1 | F1 | G1 | 6.8 g | 40 | 1.51 | 0.50 | 0.08 | 0.06 | 5.1 | 4.0 |
| Example 38 | A1 | B1 | C1 | D2 | E1 | F1 | G1 | 7.6 g | 30 | 1.51 | 0.50 | 0.08 | 0.06 | 9.6 | 4.0 |
| Comparative Example 39 | A1 | B1 | C1 | D2 | E1 | F1 | — | — | 5 | 12.03 | 0.50 | 0.08 | 0.06 | — | 4.0 |
| Comparative Example 40 | A1 | B1 | C1 | D2 | E1 | F1 | — | — | 65 | 0.91 | 0.50 | 0.08 | 0.06 | — | 4.0 |
| Comparative Example 41 | A1 | B1 | C1 | D2 | E1 | F2 | — | — | 48 | 1.51 | 0.12 | 0.08 | 0.06 | — | 4.0 |
| Comparative Example 42 | A2 | B1 | C1 | D2 | E1 | F2 | — | — | 27 | 1.51 | 1.99 | 0.08 | 0.06 | — | 4.0 |
| Comparative Example 43 | A2 | B1 | C1 | D2 | E1 | F2 | — | — | 70 | 0.38 | 0.50 | 0.08 | 0.06 | — | 4.0 |
| Comparative Example 44 | A2 | B2 | C3 | D2 | E1 | F2 | — | — | 13 | 6.03 | 0.50 | 0.08 | 0.06 | — | 4.0 |
| Comparative Example 45 | A2 | B2 | C3 | D2 | E2 | F1 | — | — | 50 | 1.51 | 1.99 | 0.30 | 0.25 | — | 4.0 |
| Comparative Example 46 | A2 | B2 | C3 | D2 | E2 | F1 | — | — | 22 | 1.51 | 0.12 | 0.02 | 0.02 | — | 4.0 |
| Comparative Example 47 | A1 | B1 | C2 | D1 | E1 | F2 | — | — | 47 | 1.51 | 0.50 | 0.08 | 0.01 | — | 4.0 |
| Comparative Example 48 | A1 | B1 | C2 | D1 | E1 | F2 | — | — | 38 | 1.51 | 0.50 | 0.08 | 0.25 | — | 4.0 |
| Comparative Example 49 | A1 | B1 | C2 | D1 | E1 | F2 | — | — | 20 | 2.41 | 0.50 | 0.08 | 0.06 | — | 2.0 |
| Comparative Example 50 | A1 | B1 | C2 | D1 | E1 | F2 | — | — | 20 | 2.41 | 0.50 | 0.08 | 0.06 | — | 7.0 |
| Comparative Example 51 | A2 | B2 | C1 + C2 | D2 | E2 | F2 | — | — | 45 | 1.51 | 0.50 | 0.08 | 0.06 | — | 4.0 |
| Comparative Example 52 | A2 | B2 | C1 + C2 | D2 | E2 | F2 | — | — | 45 | 1.51 | 0.50 | 0.08 | 0.06 | — | 4.0 |
| Comparative Example 53 | — | B1 | C1 | D2 | E1 | F2 | — | — | 0 | — | 0.50 | 0.08 | 0.06 | — | 4.0 |
| Comparative Example 54 | A2 | — | C3 | D1 | E2 | F1 | — | — | 6 | 12.03 | 0.00 | 0.08 | 0.06 | — | 4.0 |
| Comparative Example 55 | A1 | B1 | — | D1 | E2 | F2 | — | — | 14 | 0.00 | 0.50 | 0.08 | 0.06 | — | 4.0 |
| Comparative Example 56 | A1 | B1 | C2 | — | E2 | F2 | — | — | 6 | 12.03 | — | — | — | — | 4.0 |
| Comparative Example 57 | A1 | B1 | C2 | D1 | — | F2 | — | — | 5 | 12.03 | 0.50 | 0.00 | 0.06 | — | 4.0 |
| Comparative Example 58 | A1 | B1 | C2 | D1 | E2 | — | — | — | 5 | 12.03 | 0.50 | 0.08 | 0.00 | — | 4.0 |

*1: Mixing ratio (mass ratio) of silane coupling agent C1:C2 = 1:1
*2: Mixing ratio (mass ratio) of chelating agent D2:D3 = 1:1

Hereinafter, the compounds used in Table 1 will be described.

<Resin Emulsion (A) formed of cationic urethane resin emulsion (A-1) and/or non-ionic acrylic resin emulsion (A-2)>
A1: styrene-ethylmethacrylate-n-butylacrylate-acrylic acid copolymer (non-ionic acrylic resin emulsion (A-2))
A2: "ADEKA BONTIGHTER HUX-670" (cationic acrylic resin emulsion (A-1))
<Tetraalkoxysilane (B)>
B1: tetraethoxysilane
B2: tetramethoxysilane
<Silane Coupling Agent (C)>
C1: γ-glycidyl triethoxysilane
C2: (3-mercaptopropyl)trimethoxysilane
C3: N-(2-aminoethyl)-3-aminopropyltrimethoxysilane
<Chelating agent (D)>
D1: 1-hydroxymethane-1,1-diphosphonic acid
D2: acetic acid
D3: phosphoric acid
<Vanadate compound (E)>
E1: ammonium metavanadate
E2: vanadyl acetylacetonate (V: 19.2%)
<Metal Compound (F)>
F1: ammonium hexafluorotitanate
F2: titanium acetylacetonate (Ti: 12.5%)
<Lubricant (G)>
G1: polyethylene wax ("CHEMIPEARL ® 900" manufactured by Mitsui Chemicals Inc.)

(4) Treatment Method

The above-mentioned surface-treatment liquid for a zinc or zinc alloy coated steel sheet was applied by bar coating to each test piece. Each test piece was then dried, without being washed with water, in an oven at a drying temperature shown in Table 2, so that a surface-treatment coating film with a coating amount shown in Table 2 was formed thereon. The drying temperature was adjusted in accordance with the ambient temperature in the oven and the time during which the test piece stayed in the oven. In the present Examples and Comparative Examples, the drying temperature corresponds to the peak metal temperature at a surface of each test sheet. The bar coating was specifically performed as follows.

Bar coating: The surface-treatment liquid was applied dropwise to each test piece and coated thereon using a #3-#5 bar coater. The # number of the bar coater for use and the concentration of the surface-treatment liquid were adjusted so as to attain a desired coating amount.

TABLE 2

| | | Treatment Method | | |
|---|---|---|---|---|
| Evaluation Criterion | Sample Sheet type | Coating Method type | Coating Amount mg/m² | Drying Temperature ° C. |
| Example 1 | (i) | Bar Coating | 500 | 140 |
| Example 2 | (i) | Bar Coating | 500 | 140 |
| Example 3 | (i) | Bar Coating | 500 | 140 |
| Example 4 | (i) | Bar Coating | 500 | 140 |
| Example 5 | (i) | Bar Coating | 500 | 140 |
| Example 6 | (i) | Bar Coating | 500 | 140 |
| Example 7 | (i) | Bar Coating | 500 | 140 |

TABLE 2-continued

| | | Treatment Method | | |
|---|---|---|---|---|
| Evaluation Criterion | Sample Sheet type | Coating Method type | Coating Amount mg/m² | Drying Temperature ° C. |
| Example 8 | (i) | Bar Coating | 500 | 140 |
| Example 9 | (i) | Bar Coating | 500 | 140 |
| Example 10 | (i) | Bar Coating | 500 | 140 |
| Example 11 | (i) | Bar Coating | 500 | 140 |
| Example 12 | (i) | Bar Coating | 500 | 140 |
| Example 13 | (i) | Bar Coating | 200 | 140 |
| Example 14 | (i) | Bar Coating | 300 | 140 |
| Example 15 | (i) | Bar Coating | 500 | 140 |
| Example 16 | (i) | Bar Coating | 800 | 140 |
| Example 17 | (i) | Bar Coating | 1000 | 140 |
| Example 18 | (i) | Bar Coating | 500 | 140 |
| Example 19 | (i) | Bar Coating | 500 | 140 |
| Example 20 | (i) | Bar Coating | 500 | 140 |
| Example 21 | (i) | Bar Coating | 500 | 140 |
| Example 22 | (i) | Bar Coating | 500 | 140 |
| Example 23 | (ii) | Bar Coating | 500 | 140 |
| Example 24 | (i) | Bar Coating | 500 | 140 |
| Example 25 | (i) | Bar Coating | 500 | 140 |
| Example 26 | (i) | Bar Coating | 500 | 140 |
| Example 27 | (i) | Bar Coating | 500 | 140 |
| Example 28 | (i) | Bar Coating | 500 | 140 |
| Example 29 | (i) | Bar Coating | 500 | 140 |
| Example 30 | (i) | Bar Coating | 500 | 140 |
| Example 31 | (i) | Bar Coating | 500 | 140 |
| Example 32 | (iii) | Bar Coating | 500 | 140 |
| Example 33 | (i) | Bar Coating | 500 | 140 |
| Example 34 | (i) | Bar Coating | 500 | 140 |
| Example 35 | (i) | Bar Coating | 500 | 140 |
| Example 36 | (i) | Bar Coating | 500 | 140 |
| Example 37 | (i) | Bar Coating | 500 | 140 |
| Example 38 | (i) | Bar Coating | 500 | 140 |
| Comparative Example 39 | (i) | Bar Coating | 500 | 140 |
| Comparative Example 40 | (i) | Bar Coating | 500 | 140 |
| Comparative Example 41 | (i) | Bar Coating | 500 | 140 |
| Comparative Example 42 | (i) | Bar Coating | 500 | 140 |
| Comparative Example 43 | (i) | Bar Coating | 500 | 140 |
| Comparative Example 44 | (i) | Bar Coating | 500 | 140 |
| Comparative Example 45 | — | — | — | — |
| Comparative Example 46 | (i) | Bar Coating | 500 | 140 |
| Comparative Example 47 | (i) | Bar Coating | 500 | 140 |
| Comparative Example 48 | — | — | — | — |
| Comparative Example 49 | (i) | Bar Coating | 500 | 140 |
| Comparative Example 50 | (i) | Bar Coating | 500 | 140 |
| Comparative Example 51 | (i) | Bar Coating | 50 | 140 |
| Comparative Example 52 | (i) | Bar Coating | 1500 | 140 |
| Comparative Example 53 | (i) | Bar Coating | 500 | 140 |
| Comparative Example 54 | (i) | Bar Coating | 500 | 140 |
| Comparative Example 55 | (i) | Bar Coating | 500 | 140 |
| Comparative Example 56 | (i) | Bar Coating | 500 | 140 |
| Comparative Example 57 | (i) | Bar Coating | 500 | 140 |
| Comparative Example 58 | (i) | Bar Coating | 500 | 140 |

(5) Evaluation Method (5-1) Evaluation of Corrosion Resistance

A sample piece having size of 70 mm×150 mm was cut out from each test piece on which two layers of coating films had been formed as described above. The rear surface and the edges of each sample piece thus cut out were sealed by vinyl tapes and the sample piece was subjected to a salt spray test (SST) according to JIS-Z-2371-2000. To evaluate corrosion resistance, a white rust area ratio 144 hours after the salt spray test was visually measured for each sample piece and the ratio was evaluated according to the following criteria.

Evaluation Criteria:
Excellent: The white rust area ratio was less than 5%.
Good: The white rust area ratio was 5% or more and less than 20%.
Moderate: The white rust area ratio was 20% or more and less than 40%.
Poor: The white rust area ratio was 40% or more.

(5-2) Evaluation of Top Coating Properties (Adhesion Properties)

Commercially available melamine alkyd paint was applied to each sample piece having the same size as the one described above, such that coating thickness on the sample piece after baking for 30 minutes at 140° C. was 30 μm. Thereafter, the sample piece was immersed in boiling water for 2 hours and then a surface of the sample piece was cut by a cutter in a lattice pattern such that cutting reached the base steel and eventually formed one hundred 1 mm×1 mm squares at the sample piece surface. The sample piece was extruded by 5 mm using an Erichsen extruder with the cut portion of the sample piece facing outside (front side). The Erichsen extrusion conditions were set according to JIS-Z-2247-2006 (Erichsen value: IE), with the punch diameter: 20 mm, the die diameter: 27 mm, and the drawing width: 27 mm. After the Erichsen extrusion, the sample piece was subjected to tape peeling test for analyzing a remaining state of the coating film to evaluate top coating properties (adhesion properties) of the film. The evaluation criteria are as follows.

Evaluation Criteria:
Excellent: No peeling or peeled area being less than 5%
Good: Peeled area being 5% to 10% (inclusive of 5% and exclusive of 10%)
Moderate: Peeled area being 10% to 20% (inclusive of 10% and exclusive of 20%)
Poor: Peeled area of 20% or more (5-3) Evaluation of Conductivity Surface resistivity was measured for each of the above-mentioned sample piece by using Loresta-GP/ESP probe manufactured by Mitsubishi Chemical Analytec Co., Ltd. Specifically, surface resistivity was measured by stepwisely increasing load exerted on the ESP with increments of 50 g and determining the minimum load at which the surface resistivity was equal to or smaller than $10^{-4} \Omega$. Criteria for evaluating conductivity are as follows.

Excellent: Average load of 10 measurements points is less than 300 g
Good: Average load of 10 measurements points is 300 g to 500 g (inclusive of 300 g and exclusive of 500 g)
Moderate: Average load of 10 measurements points is 500 g to 750 g (inclusive of 500 g and exclusive of 750 g)
Slightly poor: Average load of 10 measurements points is 750 g to 950 g (inclusive of 750 g and exclusive of 950 g)

Poor: Average load of 10 measurements points is 950 g or more.

(5-4) Evaluation of Storage Stability

Each of the surface-treatment liquids having the component composition shown in Table 1 and Table 2 were stored in a thermostat chamber of 40° C. for 30 days and then the appearance of the surface-treatment liquid was visually inspected for evaluation.

Excellent: No change

Good: Very small amount of precipitation was observed.

Moderate: Small amount of precipitation was observed or viscosity slightly increased.

Poor: Large amount of precipitation or a gelation was observed.

The zinc or zinc alloy coated steel sheets obtained by applying the surface-treatment liquids of Examples and Comparative Examples to surfaces of zinc or zinc alloy coated layers and heating and drying the coated surfaces, respectively, were subjected to the aforementioned evaluations (5-1) to (5-4). The results are shown in Table 3. Regarding Comparative Examples 45 and 48, the surface-treatment liquids thereof were too unstable to form a film, whereby it was impossible to perform the evaluations.

TABLE 3

| Evaluation Criterion | Evaluation Result | | | |
|---|---|---|---|---|
| | Corrosion Resistance | Adhesion properties | Conductivity | Storage Stability |
| Example 1 | Excellent | Excellent | Excellent | Excellent |
| Example 2 | Excellent | Excellent | Excellent | Excellent |
| Example 3 | Excellent | Excellent | Good | Excellent |
| Example 4 | Excellent | Excellent | Excellent | Excellent |
| Example 5 | Excellent | Excellent | Excellent | Excellent |
| Example 6 | Excellent | Good | Excellent | Excellent |
| Example 7 | Excellent | Excellent | Excellent | Excellent |
| Example 8 | Excellent | Excellent | Excellent | Excellent |
| Example 9 | Excellent | Excellent | Excellent | Excellent |
| Example 10 | Excellent | Excellent | Excellent | Excellent |
| Example 11 | Excellent | Excellent | Excellent | Excellent |
| Example 12 | Good | Excellent | Excellent | Excellent |
| Example 13 | Good | Excellent | Excellent | Excellent |
| Example 14 | Excellent | Excellent | Excellent | Excellent |
| Example 15 | Excellent | Excellent | Excellent | Excellent |
| Example 16 | Excellent | Excellent | Excellent | Excellent |
| Example 17 | Excellent | Excellent | Good | Excellent |
| Example 18 | Excellent | Excellent | Excellent | Excellent |
| Example 19 | Excellent | Excellent | Excellent | Excellent |
| Example 20 | Excellent | Excellent | Excellent | Excellent |
| Example 21 | Excellent | Excellent | Excellent | Excellent |
| Example 22 | Excellent | Excellent | Excellent | Good |
| Example 23 | Excellent | Excellent | Excellent | Excellent |
| Example 24 | Excellent | Excellent | Excellent | Excellent |
| Example 25 | Good | Excellent | Excellent | Excellent |
| Example 26 | Good | Excellent | Excellent | Excellent |
| Example 27 | Excellent | Excellent | Excellent | Excellent |
| Example 28 | Excellent | Excellent | Good | Excellent |
| Example 29 | Excellent | Excellent | Excellent | Excellent |
| Example 30 | Excellent | Excellent | Excellent | Good |
| Example 31 | Excellent | Excellent | Excellent | Excellent |
| Example 32 | Good | Excellent | Excellent | Excellent |
| Example 33 | Excellent | Excellent | Excellent | Excellent |
| Example 34 | Excellent | Excellent | Excellent | Excellent |
| Example 35 | Excellent | Excellent | Excellent | Good |
| Example 36 | Excellent | Excellent | Excellent | Excellent |
| Example 37 | Excellent | Excellent | Excellent | Excellent |
| Example 38 | Good | Excellent | Excellent | Excellent |
| Comparative Example 39 | Good | Poor | Good | Excellent |
| Comparative Example 40 | Poor | Good | Slightly poor | Moderate |
| Comparative Example 41 | Poor | Good | Slightly poor | Good |
| Comparative Example 42 | Poor | Good | Excellent | Good |
| Comparative Example 43 | Poor | Good | Slightly poor | Moderate |
| Comparative Example 44 | Good | Poor | Slightly poor | Moderate |
| Comparative Example 45 | — | — | — | — |
| Comparative Example 46 | Poor | Good | Excellent | Moderate |
| Comparative Example 47 | Poor | Good | Excellent | Moderate |
| Comparative Example 48 | — | — | — | — |
| Comparative Example 49 | Good | Good | Poor | Poor |
| Comparative Example 50 | Good | Poor | Excellent | Moderate |
| Comparative Example 51 | Poor | Good | Excellent | Excellent |
| Comparative Example 52 | Excellent | Good | Poor | Excellent |
| Comparative Example 53 | Poor | Poor | Good | Excellent |
| Comparative Example 54 | Poor | Poor | Poor | Excellent |
| Comparative Example 55 | Poor | Poor | Poor | Excellent |
| Comparative Example 56 | Poor | Poor | Poor | Poor |
| Comparative Example 57 | Poor | Poor | Poor | Excellent |
| Comparative Example 58 | Poor | Poor | Poor | Excellent |

As shown in Table 3, each of the zinc or zinc alloy coated steel sheets obtained by the production method of the present invention is excellent in corrosion resistance and adhesion properties and exhibits good conductivity when the steel sheet is in contact with a gasket or the like under relatively low contact pressure. In contrast, Comparative Examples, each of which fails to satisfy at least one of the appropriate ranges of the requirements of the present invention, exhibit poor results in at least one of corrosion resistance, adhesion properties, conductivity and storage stability.

According to the present invention, it is possible to provide a zinc or zinc alloy coated steel sheet which contains no pollutant substance to be controlled such as hexavalent chromium in a coating film, is excellent in various properties including corrosion resistance and adhesion properties and, in particular, exhibits good conductivity without sacrificing corrosion resistance under a challenged condition that the steel sheet is in contact with a gasket or the like at relatively low contact pressure. The zinc or zinc alloy coated steel sheet manufactured by the production method of the present invention is therefore extremely useful as members of automobiles, home electric appliances, and office automation (OA) equipment.

The invention claimed is:

1. A method for manufacturing a zinc or zinc alloy coated steel sheet, comprising:
    preparing a surface-treatment liquid for a zinc or zinc alloy coated steel sheet, comprising components, by blending the components such that solid mass contents calculated from respective masses of the components satisfy conditions (I) to (V), where the surface-treatment liquid has a pH in the range of 3 to 6, the components including: (A) a resin emulsion formed of (A-1) a cationic urethane resin emulsion having at least one type of cationic functional group selected from the group consisting of primary to tertiary amino groups and quaternary ammonium group and/or (A-2) a non-ionic acrylic resin emulsion; (B) a tetraalkoxysilane; (C) at least one type of silane coupling agent having at least one type of reactive functional group selected from the group consisting of an active hydrogen-containing amino group, epoxy group, mercapto group, and methacryloxy group; (D) a chelating agent; (E) a vanadate compound; (F) a titanium compound; and water; and applying by coating the surface-treatment liquid to a surface of a zinc or zinc alloy coated steel sheet, heating and drying the surface of the zinc or zinc alloy coated steel sheet such that a coating amount per surface is in the range of 200 to 1,000 mg/m² to form a surface treatment coating film on the surface, wherein the conditions (I) to (V) are as follows:

(I) solid content ($A_S$) of the resin emulsion (A) with respect to the total solid content of the surface-treatment liquid is 10 to 45 mass %;

(II) solid mass ratio ($C_S/A_S$) of solid content ($C_S$) of the silane coupling agent (C) with respect to solid content ($A_S$) of the resin emulsion (A) is 1.51 to 5.89;

(III) solid mass ratio ($B_S/D_S$) of solid content ($B_S$) of the tetraalkoxysilane (B) with respect to solid content ($D_S$) of the chelating agent (D) is 0.15 to 1.49;

(IV) solid mass ratio ($E_V/D_S$) of content ($E_V$) of the vanadate compound (E) in terms of V with respect to solid content ($D_S$) of the chelating agent (D) is 0.03 to 0.23; and (V) solid mass ratio ($F_T/D_S$) of content ($F_T$) of the titanium compound (F) in terms of Ti with respect to solid content ($D_S$) of the chelating agent (D) is 0.02 to 0.19.

2. The method for manufacturing a zinc or zinc alloy coated steel sheet according to claim 1, wherein the surface-treatment liquid further contains a lubricant (G) in the range of 1 to 10 mass % with respect to the total solid content of the surface-treatment liquid.

3. A method for manufacturing a zinc or zinc alloy coated steel sheet, comprising:

preparing a surface-treatment liquid for a zinc or zinc alloy coated steel sheet, comprising components, by blending the components such that solid mass contents calculated from respective masses of the components satisfy conditions (I) to (V), where the surface-treatment liquid has a pH in the range of 3 to 6, the components including: (A) a resin emulsion formed of (A-1) a cationic urethane resin emulsion having at least one type of cationic functional group selected from the group consisting of primary to tertiary amino groups and quaternary ammonium group and/or (A-2) a non-ionic acrylic resin emulsion; (B) a tetraalkoxysilane; (C) at least one type of silane coupling agent having at least one type of reactive functional group selected from the group consisting of an active hydrogen-containing amino group, epoxy group, mercapto group, and methacryloxy group; (D) a chelating agent; (E) a vanadate compound; (F) a titanium compound; and water; and applying by coating the surface-treatment liquid to a surface of a zinc or zinc alloy coated steel sheet, heating and drying the surface of the zinc or zinc alloy coated steel sheet such that a coating amount per surface is in the range of 200 to 1,000 mg/m² to form a surface treatment coating film on the surface, wherein the conditions (I) to (V) are as follows:

(I) solid content ($A_S$) of the resin emulsion (A) with respect to the total solid content of the surface-treatment liquid is 11 to 45 mass %;

(II) solid mass ratio ($C_S/A_S$) of solid content ($C_S$) of the silane coupling agent (C) with respect to content ($A_S$) of the resin emulsion (A) is 1.51 to 5.35;

(III) solid mass ratio ($B_S/D_S$) of solid content ($B_S$) of the tetraalkoxysilane (B) with respect to solid content ($D_S$) of the chelating agent (D) is 0.15 to 1.49;

(IV) solid mass ratio ($E_V/D_S$) of content ($E_V$) of the vanadate compound (E) in terms of V with respect to solid content ($D_S$) of the chelating agent (D) is 0.03 to 0.23; and (V) solid mass ratio ($F_T/D_S$) of content ($F_T$) of titanium compound (F) in terms of Ti with respect to solid content ($D_S$) of the chelating agent (D) is 0.02 to 0.19.

4. The method for manufacturing a zinc or zinc alloy coated steel sheet according to claim 3, wherein the surface-treatment liquid further contains a lubricant (G) in the range of 1 to 10 mass % with respect to the total solid content of the surface-treatment liquid.

5. A zinc or zinc alloy coated steel sheet manufactured by the method described in claim 1.

6. A zinc or zinc alloy coated steel sheet manufactured by the method described in claim 3.

7. A zinc or zinc alloy coated steel sheet manufactured by the method described in claim 3.

8. A zinc or zinc alloy coated steel sheet manufactured by the method described in claim 4.

* * * * *